March 9, 1965 R. C. JOHNSON ETAL 3,172,930
TREATING PLASTIC FILM EXTRUDATE
Filed Sept. 24, 1962
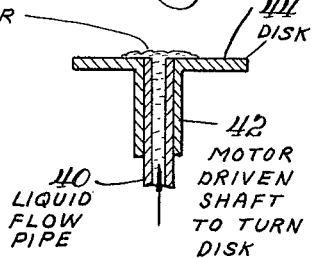
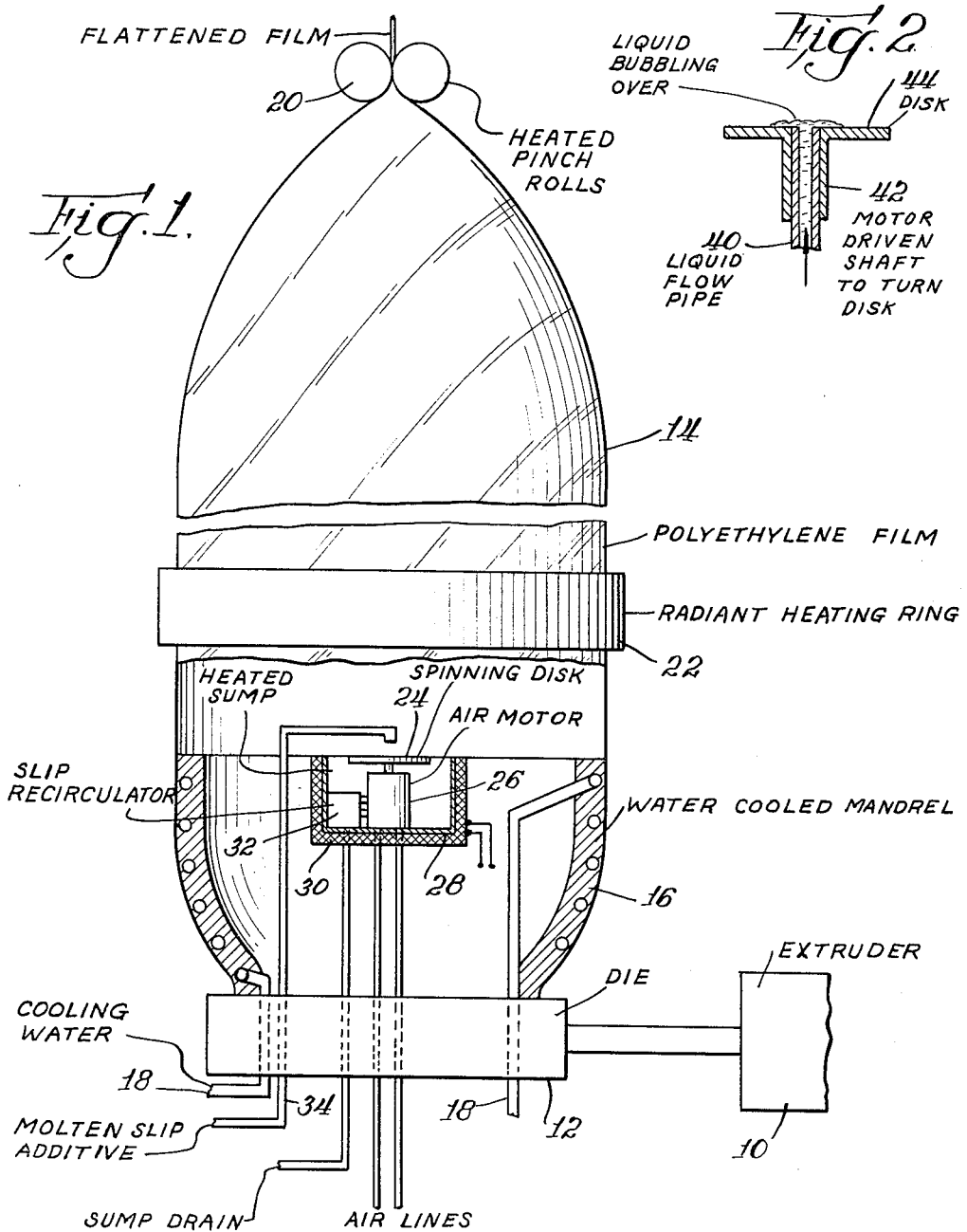
INVENTORS
Richard C. Johnson and
Donald L. Graham
By Stephen J. Rudy
Jerome Rudy Attys.

3,172,930
TREATING PLASTIC FILM EXTRUDATE
Richard C. Johnson and Donald L. Graham, Midland,
Mich., assignors to The Dow Chemical Company, Midland, Mich., a corporation of Delaware
Filed Sept. 24, 1962, Ser. No. 225,616
6 Claims. (Cl. 264—130)

This invention relates to an improvement in treating plastic film extrudate, and more particularly, to a method and means for dry coating a slip surface onto polyethylene film during extrusion.

In the past, several methods have been utilized to render the surface of a film extrudate slippery, so that the film will not stick together when rolled upon a roll, or when used in a process, and to aid in further handling and use. One method is to add a slip agent to the polymeric resins prior to extrusion into film. Such additives exude to the surface of the film after leaving the die. Another method is to dust the inside of the tube with a fine powder as the tube is being extruded.

The extrusion of slip-containing resins over a chilled mandrel, as is well known to those skilled in the art, results in excessive condensation of slip additive on the cool mandrel. Periodically, accumulations of condensed slip additive break loose from the mandrel and adhere to the film, resulting in unsightly, unsalable film. Addition of slip additives by means of conventional coating methods requires expensive secondary operations.

The present invention includes certain improvements which avoid shortcomings of prior art methods and make for more overall satisfactory results. Briefly, the inventive concept includes means for depositing a liquid additive upon a spinning disc which spins the additive off in atomized particles and onto the interior surface of an extruded tubular film. The tubular film is then passed through a radiant heater, whereupon the additive is melted to fully coat the interior surface of the tubular film. After having been thus treated, the film is flattened by pinch rollers and wound upon suitable rolls, as desired. The apparatus which may be used to effect the method of the invention, is relatively simple, reliable, and may be directly and conveniently installed on existing film extruders.

The main object of this invention is to provide a method and means for applying a slip coating to the interior surface of extruded plastic film.

Another object is to provide a method and means to apply a full coating of slip agent to the interior surface of extruded polymeric film, which means are simple, reliable and may be directly and conveniently installed on existing film extruders.

These and further objects and features of the invention will become more apparent from the following description and accompanying drawing wherein:

FIG. 1 is a schematic drawing illustrating an embodiment incorporating the principles of the invention, and FIG. 2 is a fragmentary drawing showing a modification in detail of the embodiment of FIG. 1.

Referring now to the drawing, an extruder 10 is shown which feeds extrudable plastic materials, e.g. polyethylene, into a ring die 12 arranged to extrude a thin tube of material 14 upwardly about a circular water cooled mandrel 16, having a water circulating pipe 18. The tube is eventually flattened by a pair of pinch rolls 20, and directed to windup or other process mechanism (not shown). In its upward travel, the tube 14 passes through a radiant heating ring 22. This much of the disclosed apparatus is well known to those skilled in the art, and no claim per se is made thereto.

The inventive concept, as set forth hereinbefore, relates to a method and means for coating the interior of the tube 14 with a molten slip additive, which may be an oleic acid amid, or an erucylamide, for example. Toward this end, additive dispensing means is provided which includes a disc 24, the plane of which is arranged in a horizontal position, i.e., normal to the inner wall of the tube 14, and in an axial location. High speed rotary motion of the disc 24 is provided by a motor means, such as air driven motor 26, which is positioned in an open top vessel, or sump pan 28. It will be noted that the top of the disc 24 is substantially in alignment with the top of the sump pan 28. In such manner, the heavier particles spun off the disc 24 will drop into the sump pan. However, means (not shown) may be arranged to adjust the relative position between the top of the disc 24 and top of the sump pan 28, so that more or less of the particles spun off the disc may be intercepted. Heating means, such as an electrical resistance heater 30 may be placed about the sump pan for keeping the additive collected therein at flowable temperature. A liquid recirculator means, such as an air driven pump 32, is provided in the sump pan for pumping the additive, collected in the sump pan, back to a pump means (not shown) which feeds the additive onto the spinning disc 24.

The slip additive is directed from a pump means, through a pipe 34, and deposited, as by dripping, on top of the spinning disc 24. Centrifugal force causes the additive to be spun off the disc, whereupon it solidifies, and takes the form of minute, discrete particles, which adhere to the inner surface of the tubular film 14. The size and quantity of the particles will depend, of course, on certain variables, such as rate of additive flow, temperature of the additive, speed of rotation of the disc, to mention the more important variables. As the tubular film passes through the radiant heating ring 22, the particles are melted and form a thin coating on the film surface. The melting temperature used must, of course, be lower than the softening temperature of the tubular film. After passing through the heating ring, the additive will cool and form a slip surface on the treated film.

From the foregoing, it will be seen that the disclosed method and means, will satisfy all of the objectives set forth hereinbefore.

The modification shown in FIG. 2, relates to another method for depositing the liquid slip additive upon a spinning disc. As seen therein the liquid is directed through a pipe 40, which is concentrically arranged with a motor shaft 42. Liquid is pumped upwardly through pipe 40, and allowed to bubble, or otherwise be released upon a disc 44, and in the center thereof, which disc is rotated by the motor shaft 42. All other parts of the modified embodiment will be as shown in FIG. 1.

The foregoing description has been given in detail without thought of limitation since the inventive principles involved are capable of assuming other forms without departing from the spirit of the invention or the scope of the following claims.

What is claimed is:

1. A method for coating the surface of a plastic film comprising the steps of, directing a liquid slip agent to a point near said plastic film as it is being extruded, applying the liquid to a rapidly rotating means to spin off the liquid in solid minute, discrete particles, allowing the particles to come into contact with the film, and heating the particles so that they melt and form a slip coating on the film.

2. A method for dry coating the interior surface of a tubular plastic film comprising the steps of, directing a liquid slip agent to a point near the axis of the tubular plastic film as it is being extruded, applying the liquid to a rapidly rotating means to spin off the liquid in solid minute, discrete particles, allowing the particles to come into contact with the film, and heating the particles so that they melt and form a slip coating on the film.

3. A method for dry coating the interior surface of a tubular plastic film comprising the steps of, directing a liquid slip agent to a point near the axis of the tubular plastic film as it is being extruded, dripping the liquid on top of a spinning disc, the axis of which is parallel with the axis of the tubular film and which is rotating at a speed to cause the liquid to be spun off in solid, minute particles which adhere to the inner surface of the film, and passing the particle covered tube through a radiant heating ring to melt the particles and form a slip coating on the film.

4. Apparatus for dry coating the surface of a plastic film as it is being extruded, said apparatus including means to solidify a liquid slip agent into minute solid particles and to apply said particles to said film whereby said particles will adhere to the surface of the film, and means to melt the particles on the film to provide a slip coating thereupon.

5. Apparatus for dry coating the interior surface of a tubular plastic film as it is being extruded, said apparatus including a rotatable disc arranged within the tubular film with the axis of rotation of the disc parallel to the axis of the film, means to apply a liquid slip agent to the surface of the disc, means to rotate the disc at a speed which causes said liquid to be spun off the disc in minute, solid particles which adhere to the surface of the film, and means to melt the particles so that they form a slip coating on the film.

6. Apparatus for dry coating the interior surface of a tubular plastic film as it is being extruded, said apparatus including a rotatable disc arranged within a tubular film with the axis of rotation of the disc parallel with the axis of the film, a pipe arranged for dripping a liquid slip agent upon the disc, a motor means to rotate the disc at a speed which causes said liquid to be spun off the disc in minute solid particles which adhere to the surface of the film, a sump pan surrounding the motor means, the upper edge of the pan being in substantial alignment with the upper surface of the disc, a liquid recirculating means in the pan, means to heat the pan, and a radiant heating means for melting the particles adhering to the interior surface of the film.

References Cited in the file of this patent

UNITED STATES PATENTS 2,641,022    Kress  ---------------- June 9, 1953